United States Patent
Tourrilhes et al.

(10) Patent No.: US 11,349,740 B2
(45) Date of Patent: May 31, 2022

(54) AVAILABLE BANDWIDTH ESTIMATION BASED ON PACKET SKIPPING IN ONE-WAY DELAY (OWD) BASED ANALYSIS

(71) Applicant: Hewlett Packard Enterprise Development LP, Houston, TX (US)

(72) Inventors: Jean Tourrilhes, Palo Alto, CA (US); Puneet Sharma, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 20 days.

(21) Appl. No.: 16/861,583

(22) Filed: Apr. 29, 2020

(65) Prior Publication Data
US 2021/0344581 A1 Nov. 4, 2021

(51) Int. Cl.
| H04L 43/0882 | (2022.01) |
| H04L 41/0896 | (2022.01) |
| H04L 43/12 | (2022.01) |
| H04L 47/70 | (2022.01) |
| H04L 43/0852 | (2022.01) |
| H04L 47/10 | (2022.01) |
| H04L 43/10 | (2022.01) |

(52) U.S. Cl.
CPC ...... *H04L 43/0882* (2013.01); *H04L 41/0896* (2013.01); *H04L 43/0852* (2013.01); *H04L 43/10* (2013.01); *H04L 43/12* (2013.01); *H04L 47/10* (2013.01); *H04L 47/823* (2013.01)

(58) Field of Classification Search
None
See application file for complete search history.

(56) References Cited

U.S. PATENT DOCUMENTS

| 7,072,304 B2 | 7/2006 | Ng et al. |
| 8,144,586 B2 | 3/2012 | Mcnaughton et al. |
| 9,876,682 B2 | 1/2018 | Bernstein et al. |
| 2004/0243335 A1* | 12/2004 | Gunawardena ..... H04L 67/1002 702/116 |

(Continued)

FOREIGN PATENT DOCUMENTS

| EP | 1116120 A1 | 7/2001 |
| WO | 00/13093 A1 | 3/2000 |
| WO | 2015/119895 A1 | 8/2015 |

OTHER PUBLICATIONS

Dovrolis et al., "Packet-Dispersion Techniques and a Capacity-Estimation Methodology", IEEE/ACM Transactions on Networking, vol. 12, No. 06, Dec. 2004, pp. 963-977.

(Continued)

*Primary Examiner* — Joshua Joo
(74) *Attorney, Agent, or Firm* — Jaffery Watson Mendonsa & Hamilton LLP (57) ABSTRACT

Techniques and architectures for measuring available bandwidth. A train of probe packets is received from a remote electronic device. A received time for a first subset of the train of probe packets is measured. A change in capacity of the network path is determined based on the measured received time for the first subset of packets. Packets from the train of probe packets prior to the detected change in capacity of the network path are excluded to identify a second subset of packets. An estimated available bandwidth is computed based on the second subset of packets from the train of probe packets.

20 Claims, 8 Drawing Sheets

(56) References Cited

U.S. PATENT DOCUMENTS

| | | | | |
|---|---|---|---|---|
| 2010/0110922 A1* | 5/2010 | Keth | .................... | H04L 43/0882 |
| | | | | 370/252 |
| 2010/0278042 A1* | 11/2010 | Monnes | .............. | H04L 43/0894 |
| | | | | 370/230 |
| 2011/0149751 A1* | 6/2011 | Li | ........................ | H04L 43/0882 |
| | | | | 370/252 |
| 2012/0158949 A1* | 6/2012 | Lee | ..................... | H04L 41/0896 |
| | | | | 709/224 |
| 2015/0146560 A1* | 5/2015 | Johnsson | ............ | H04L 43/0882 |
| | | | | 370/252 |
| 2019/0379591 A1* | 12/2019 | Boughzala | ........... | H04L 41/0816 |

OTHER PUBLICATIONS

Ghobadi et al., "Trickle: Rate Limiting YouTube Video Streaming", 2012 USENIX Annual Technical Conference, Jun. 13-15, 2012, 6 pages.

* cited by examiner

AVAILABLE BANDWIDTH ESTIMATION BASED ON PACKET SKIPPING IN ONE-WAY DELAY (OWD) BASED ANALYSIS

BACKGROUND

Bandwidth measurement and estimation is an essential part of any network traffic engineering solution including, for example, software defined wide area network (SDWAN) solutions. It is useful to determine how much capacity is available on each network path before deciding where to place/route and load balance the network traffic. It is also useful to know the available bandwidth to help a user or network administrator understand the current network condition.

In a closed system, it is possible to collect direct measurements on each network device of the traffic path. However, in many cases, it is not possible to use direct measurement. For example, when the network devices are in different administrative domains or when measurable characteristics are hidden by tunneling or encapsulation. This is the case for SDWANs that connect multiple sites with each other using multiple available wide area networks (WANs) to create paths utilizing the Internet, for example.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In electronic networks (whether wired or wireless) packets are utilized to transmit data. Networks can be configured to connect any number of endpoints, for example, any number of client devices and any number of server devices. In most networks there exist multiple possible paths between endpoints. Having multiple paths between endpoints improves resilience to failure and can increase network capacity. The ability to efficiently and accurately measure or estimate bandwidth is important for network management and administration in order to efficiently allocate network resources and provide optimal network performance.

When direct measurements are not possible, bandwidth estimation is done from two end-points that can be controlled/used for measurements. This is usually performed by probing the network path with specially crafted probe packets sent from one end of the path to the other end of the path. The receiver end measures the receive time of the packets and the changes to the packet delay/time pattern to estimate the path characteristics, such as the path capacity, the available bandwidth and/or the bulk transfer capacity.

PathCos++ and Self-Loading Decreasing-Rate Train (SLDRT) are two example current techniques for available bandwidth estimation. These techniques rely on sending a train of probe packets with decreasing rate, and measuring the received probe rate between two points of equal congestion. PathCos++, SLDRT and some other bandwidth estimation techniques each use a Bump Detection Algorithm (BDA) for selecting those two points of equal congestion. However, the various Bump Detection Algorithms assume that the capacity of the path during measurement is equal to its long term behavior. Some network elements present short term capacity fluctuations that deviate significantly from the long term average and can create large errors in the available bandwidth estimate.

The techniques and architectures described herein provide a unique and advantageous technique to identify part of the probe train where capacity fluctuates, and to mitigate the effect of capacity fluctuation. This can dramatically improve the performance of bandwidth estimation techniques using techniques similar to, for example, PathCos++ and SLDRT.

The models used for bandwidth estimation assume that the path is stateless and timeless and that the time scale of measurement does not matter. These models assume that the behavior of the queues does not change and the capacity of the various links is constant. The models are also based on the assumption that variation in available bandwidth is only due to variation in cross traffic. However, in practice, some network elements have time varying behavior and their capacity can change over time. That is, over a short period of time (e.g., the time during which a probe train is transmitted), the network element behavior does not correspond to their long term average.

One potential cause of capacity fluctuation is referred to as cold start. Some devices need some time before they can start forwarding packets at optimal rate or latency. For example, a switch may need to populate its learning table, an OpenFlow device may need the central controller to install forwarding rule, a software router may need to wake up and schedule the forwarding process. This behavior may occur for the aggregate of traffic or for a specific subset of traffic, which means that even a device processing cross traffic may exhibit cold start for the probe packets.

Thus, a cold start condition impacts the one-way delay (OWD) of probe packets across the probe train. The first few packets will suffer from a higher OWD due to the cold start conditions. In many cases, the first few packets take more time to process and are sent at a rate slower than the available bandwidth. In other cases, the packets are queued longer and then sent faster as the device catches up with the backlog.

Figure 1:
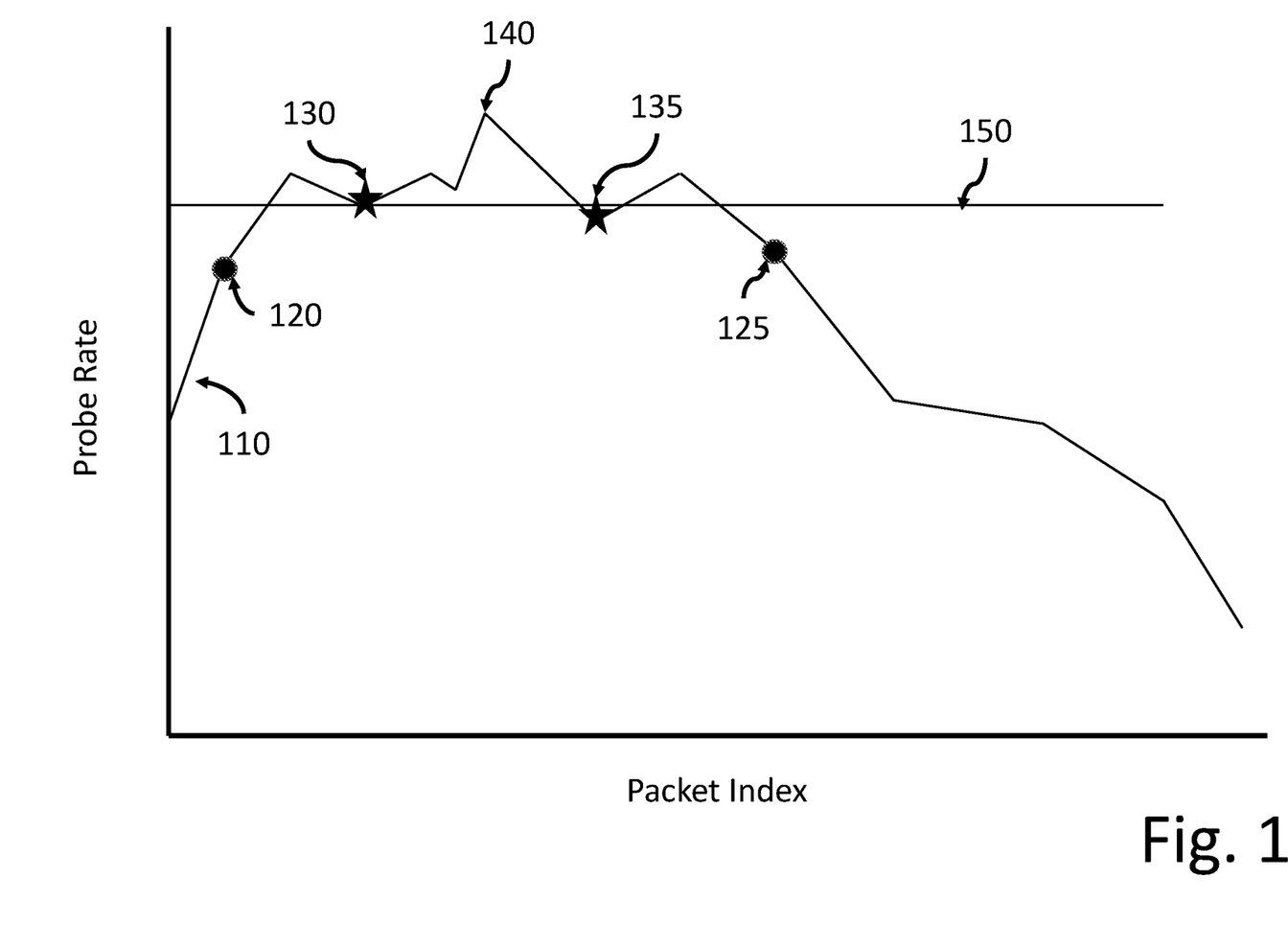
FIG. 1 provides a conceptual illustration of a cold start condition.

FIG. 1 provides a conceptual illustration of a cold start condition. In the example of FIG. 1, the train of packets are initially transmitted at a slower rate, then at the long-term rate and finally at rate to allow decongestion of the network. Line 110 represents the moving average packet received rate, which is also referred to as "aRRp" below. Line 150 represents the long-term average packet rate and point 140 represents the peak of the bump.

Packet pair 120, 125 represents a packet pair selected using a bump detection algorithm that does not compensate for the cold start condition. Packet pair 130, 135 represents a packet pair selected using a bump detection algorithm that does compensate for the cold start condition. Thus, compensating for the cold start condition allows selection of a packet pair that is more representative of the long-term average packet rate.

Another possible cause of capacity fluctuation is use of rate limiters based on token buckets. A rate limiter functions to enforce a long term rate for the traffic passing through it. However, traffic is both discrete (i.e., packets cannot be split) and bursty, so the rate limiter needs a mechanism for averaging enforcement. This is done usually with a token bucket.

The token bucket is a container of virtual credits. When a packet is to be sent, a token is removed from the bucket. If the bucket is empty, no token can be removed, and the packet is either dropped or queued for later. The token bucket is refilled with tokens at a constant rate, which is the desired long term rate. The bucket has a maximum capacity, and when it is full, new tokens are discarded. The size of the bucket is called the burst size, and this is what allows the use of token buckets to smooth and average instantaneous variation in input traffic.

A token bucket will create variations in the output rate. If the input traffic rate was below the target rate for some time, the bucket becomes full. If new traffic arrives at the rate limiter, its output rate is unconstrained as long as tokens are available in the bucket, and this burst of packets can have a rate much higher than the target rate. Only when the bucket is empty the target rate is enforced on the traffic.

This behavior has direct impact on the OWD of probe packets. When trying to create congestion, at first the rate limiter is in burst mode and will send probe packets at a rate much higher than the long term rate. In this phase, the OWD will see only modest increase, because packets are not queued by the rate limiter. When the bucket is empty, probe packets are sent at the long term rate, they are queued and consequently their OWD increases significantly.

Figure 2:
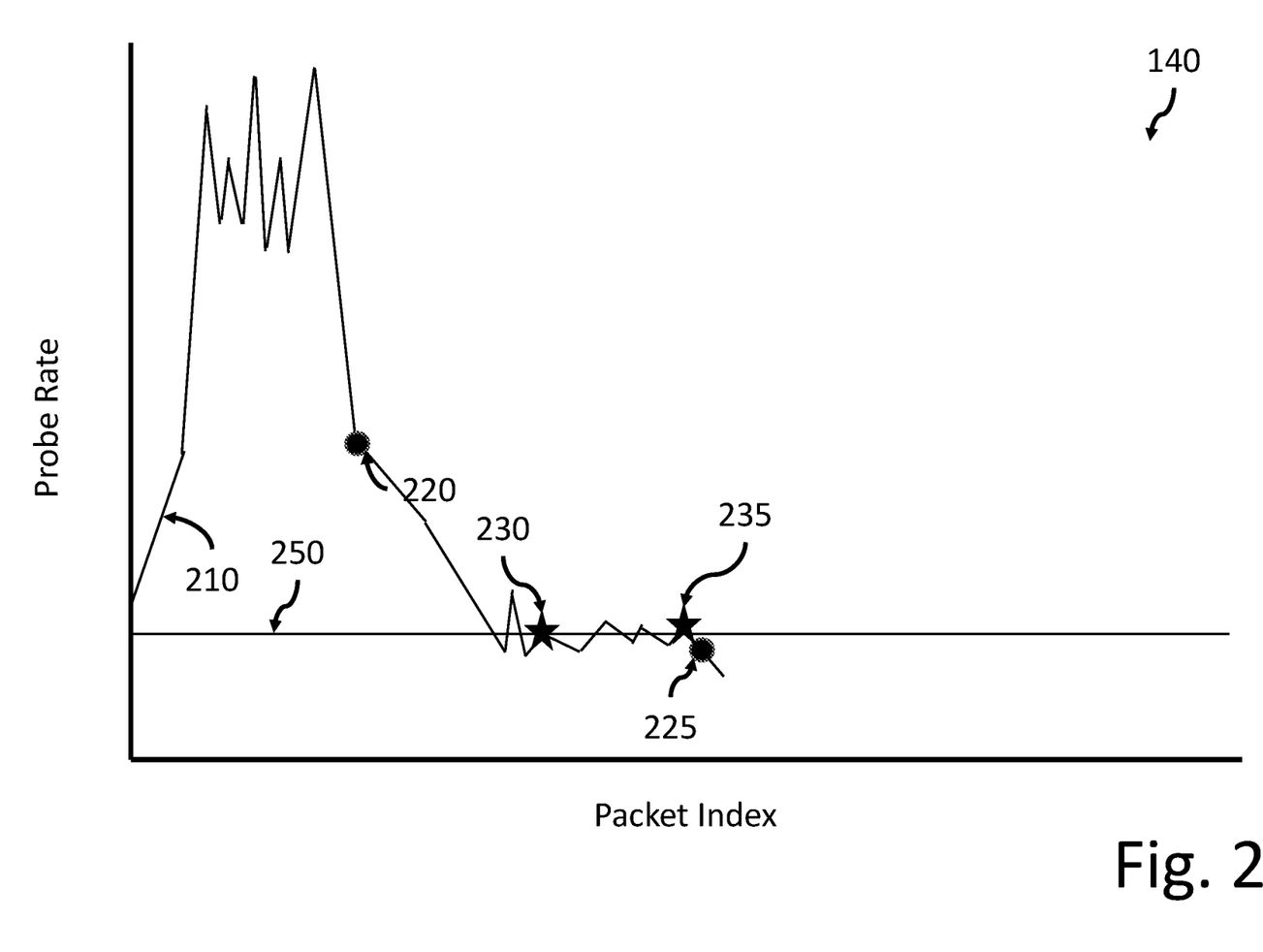
FIG. 2 provides a conceptual illustration of a bursting condition.

FIG. 2 provides a conceptual illustration of a bursting condition. In the example of FIG. 2, the train of packets are initially transmitted at a high, unstable rate, then at the long-term rate and finally at rate to allow decongestion of the network. Line 210 represents the average packet received rate. Line 250 represents the long-term average packet rate.

Packet pair 220, 225 represents a packet pair selected using a bump detection algorithm that does not compensate for the bursting condition. Packet pair 230, 235 represents a packet pair selected using a bump detection algorithm that does compensate for the bursting condition. Thus, compensating for the bursting condition allows selection of a packet pair that is more representative of the long-term average packet rate.

These capacity fluctuations directly impact the estimation of available bandwidth. Techniques using a BDA, such as PathCos++, SLDRT, etc., derive their estimate from computing the average received rate between two probe packets, with the first packet close to the start of the probe train. The aim of bandwidth estimation is to estimate the long term available bandwidth. When the measurement between two probe packets includes a period during which the capacity of the path fluctuates significant estimation error can occur.

Various embodiments of techniques and mechanisms to mitigate capacity fluctuations and OWD noise in the BDA portion of various bandwidth estimation techniques are described below. In some embodiments, the BDA can be caused to skip packets at the start of the probe train based on the smoothness of the slope of the congestion bump.

The techniques described herein can reduce the impact of capacity fluctuations and OWD noise to improve available bandwidth estimation accuracy. In some embodiments, these techniques can be fit into existing BDA-based strategies to provide available bandwidth estimation. The techniques described herein are generally low overhead and efficient to improve available bandwidth estimation without significantly slowing the overall operation.

Figure 3:
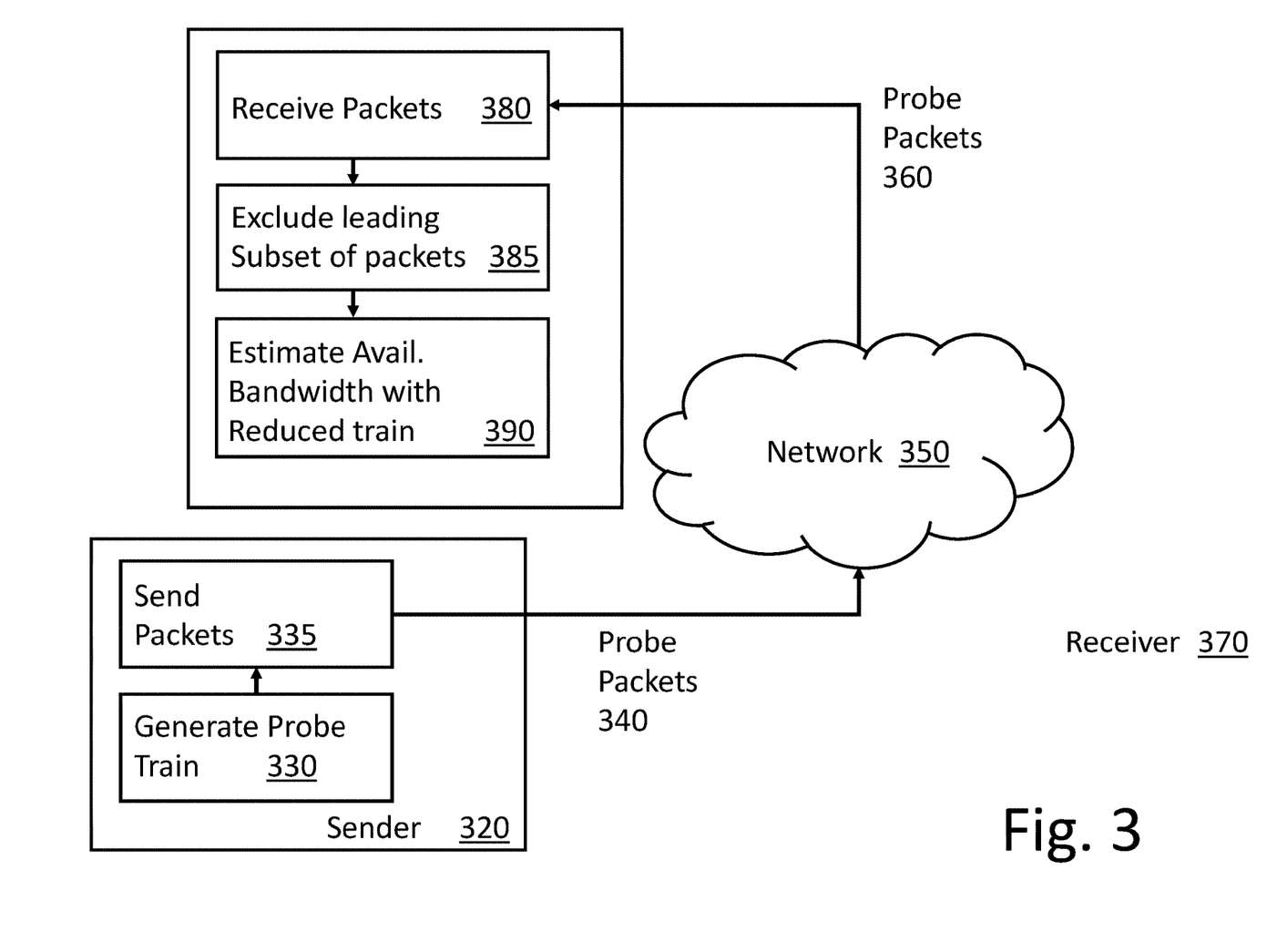
FIG. 3 is a block diagram of one embodiment of an architecture to estimate available bandwidth.

FIG. 3 is a block diagram of one embodiment of an architecture to estimate available bandwidth. In the example of FIG. 3, sender 320 generates a probe train 330 and sends the packets 335 over network 350. The packets that are sent by sender 320 are probe packets 340 that move through network 350 to receiver 370.

One or more of probe packets 340 can be lost or delayed to result in probe packets 360 that are received by receiver 370. When probe packets 360 arrive, receiver 370 receives the packets 380 and excludes a subset of probe packets 385 by utilizing inter-arrival time (IAT) fitting techniques to reduce capacity fluctuation effects by, for example, skipping a first portion of packets from the received probe train for available bandwidth estimation operations. Details and embodiments of the exclusion of probe packets are provided in greater detail below. In various embodiments, receiver 370 can exclude a determined number of the first packets from the received probe train in determining a packet pair for available bandwidth estimation. Available bandwidth estimation is performed utilizing a packet pair selected from the reduced probe train, 390.

The goal of bandwidth estimation as performed by receiver 370 is to estimate the long-term available bandwidth of the network path being measured (e.g., through network 350). Some network devices have capacity fluctuations, which introduce significant estimation error. The capacity fluctuations occur at the beginning of the probe train for the reasons discussed above, before capacity settle to the long-term rate. Thus, elimination of the estimation error due to capacity change can improve the final estimation.

The relevant errors are due to the inclusions of packets that are forwarded when the network path is not in long term mode (i.e., before the capacity change). The packets may be forwarded too fast (e.g., rate limiter bursting), or too slow (e.g., cold start). Packets forwarded after the capacity changes are forwarded at the proper rate.

Packet skipping techniques can function to split the received probe train in two parts, before and after the capacity change. In some embodiments, for the purpose of available bandwidth (ABW) estimation, packet before the capacity change can be ignored. The available bandwidth estimation is then is performed only on packets after the capacity change.

Most available bandwidth estimation techniques expect to process the whole probe train, and ignoring the first part of the probe train may not be compatible with traditional available bandwidth estimation techniques and may increase the error. Specifically, the ignored packets have impacted the network path and may have created congestion, which is contrary to the assumption of many available bandwidth estimation techniques. As the result, the packet skipping strategies discussed herein may not be compatible with increasing methods for available bandwidth estimation. Also, in most cases, the packet skipping strategies may not be compatible with SLDRT, because SLDRT depends on the first used packed having no congestion.

The packet skipping strategies discussed herein can be compatible with some existing available bandwidth estimation techniques including, for example, PathCos++ and Voyager-2. These techniques assume the first part of the probe train creates congestion and they attempt to match the congestion level of the pair of packets selected so that they can work around the congestion condition created by the skipped packets.

Most network path estimation techniques send packets in a very controlled manner so that congestion can be accurately probed. In general, these techniques try to create a specific pattern of packets, with specific time intervals between packets. The interval between packets defines an instantaneous rate being probed, and the network path will react to that probed rate.

For each packet, the Inter Departure Time (IDT) is the amount of time between sending the previous packet and sending current packet. The IDT can be computed from the desired probing rate:

$$IDT = PacketSize/ProbeRate$$

In the case of PathCos++ and SLDRT, for example, the IDT of packet is exponentially increasing, which means each packet interval is probing with exponentially decreasing probing rates.

In general, the sender cannot be totally accurate in sending packets, so the actual IDT of the packet may be different from the desired/theoretical IDT. It is possible to modify most techniques to measure the actual IDT. The techniques described herein will work using both the desired IDT or the actual IDT, but will give better results with the actual IDT.

Available bandwidth estimation techniques also measure when packets are received. For each packet, the Inter Arrival Time (IAT) is the amount of time between receiving the previous packet and receiving current packet. From the IAT, the instantaneous per-packet received rate can be computed:

$$ReceivedRate = PacketSize/IAT$$

Further, the overall IAT (oIAT) is the difference in received time between two non-adjacent/non-consecutive packets.

Most network path estimation techniques measure the delays of received packets to determine the network path bandwidth. They measure for each packet the One-Way Delay (OWD), the time difference between when the packet was sent (sent time) and when it was received (received time). Most techniques compare the OWD of multiple packets.

The One Way Delay of a packet is mostly governed by the propagation delay of the network path, the transmission time of the slowest link of the path, and the accumulated queuing delay in all the network elements in the path. For each packet, OWD can be determined by:

$$OWD(i) = pd + st(size) + sum(qd(e,i))$$

Where "pd" is the total propagation delay, "st(size)" is the slowest transmission time for this packet size, and "qd(e,i)" is the queuing delay at element 'e' for packet T. Previous network path estimation techniques assume a relatively simple queuing model where qd(e,i) is a function of the congestion at element 'e' when packet T arrives.

The sender and receiver use different clocks to measure packet departure and arrival and these clocks might not be perfectly synchronized. Therefore, it is hard to accurately measure the OWD of packets. Fortunately, in most cases the absolute OWD of packets does not matter and only the difference between the OWDs of different packets matters. Over the short time of a probe train, clock drift is negligible, and therefore the difference between OWDs can be accurate enough.

If there is no packet losses and no packet reordering, packets are sent and received in the same order. In this case, the IAT, IDT and OWD of each packet are directly related. If "OWDp" is the One Way Delay of the previous packet, and "OWDc" the One Way Delay of the current packet, IAT can be determined by:

$$IAT = OWDc - OWDp + IDT$$

The various parameters discussed above in association with a Bump Detection Algorithm (BDA) can be utilized to select a pair of packets for use in available bandwidth estimation. The general purpose of the BDA is to select a pair of packets with similar congestion on both sides of the congestion peak (i.e., the Bump). The pair of packets selected is then used to estimate the available bandwidth. Therefore, the quality of the available bandwidth estimate is only as good as the selection of those packets.

The probe train has a decreasing rate, therefore it first creates congestion of the network path by transmitting at a rate higher than the bottleneck, and then allows the path to decongest by transmitting at a rate lower than the bottleneck. This means that across the probe train, first the OWD of packets goes up (congestion) and then down (decongestion). The big bump in OWD represent the time of maximum congestion, and packets with similar OWD should have experienced similar congestion (similar amount of queuing).

The BDA must select packets parts of the same congestion period. If they are not part of the same congestion period, it means that there is some idle time between those two packets, and in this case not much can be said apart from the fact that the rate of packet is lower than the available bandwidth. If two packets are part of the same congestion period and have similar congestion, the overall rate of probes between these two packets have a fairly neutral contribution to congestion, which means the overall rate of probes is close to the available bandwidth.

Usually, the congestion bump is composed of many packets, and there are many choices of packets that have similar OWD. The BDA may select packets high in the bump (packets with higher OWD) or lower in the bump (packets with lower OWD). If packets lower in the bump, where OWD is close to its uncongested value, are selected congested packets cannot be properly distinguished from uncongested packets and it is possible that the selected packets are not in the same congestion period.

Conversely, selecting packets higher in the bump can be problematic. The assumption that packets with similar OWD should have experienced similar congestion is only true at the onset of congestion, and at very low levels of congestion. Some bottlenecks with cross traffic do not have symmetric behavior when going into congestion and decongestion, and in those cases, for medium to high congestion, packets with similar OWD have not experienced similar congestion. Further, to avoid issues with the granularity of OWD, and to have a better averaging over time, it is better to select a pair of packets that are as far apart on the bump as possible, which equates to lower in the bump.

An increase in OWD in the probe train in theory indicates increased congestion, however in reality OWD measurement are very noisy. This noise is due to the imperfection and non-ideal behavior of the various network elements and other packet scheduling constraints. Because OWD and IAT are directly related, the OWD noise also affects IAT measurements.

Such noise in the OWD directly impacts the BDA function. Noisy OWD values may lead the BDA to select two packets with similar OWD that did not experience the same level of congestion, or packets that are not part of the same congested period. This can lead to improper available bandwidth estimate.

A large source of measurement noise is packet batching. Packet batching happens when in a queue, packets are processed as a group, instead of individually. This packet batching may drastically impact the one way delay of packets. Earlier packets in the group have to wait for the group to be processed and see their OWD artificially inflated, whereas the later packets of the group wait less and have a lower OWD.

Packet batching can produce saw-tooth patterns in the measured OWD. Often, the strength of the saw-tooth pattern is close to the effect of congestion and is much greater than any other OWD noise. Similarly, packet batching also produces peaks and valleys in IAT measurements that are generally larger than other IAT noises and the effect on congestion and capacity changes.

In some embodiments, packet batching mitigation can be used to effectively filter the packets and pick those at the bottom of the saw-tooth. In most cases, this greatly reduces the OWD noise, however it may not remove all OWD noise due to packet batching.

In order to mitigate capacity change, the changes in capacity must be detected. Measuring path capacity is as complicated as measuring available bandwidth. Most available bandwidth techniques do not measure capacity, and none do it at the per-packet granularity needed to address rate limiter bursts and cold start. Therefore, in some embodiments, capacity changes are inferred based on their impact on received probe packets.

The congestion experienced by probe packets on the network depends generally on three factors: 1) link capacities, 2) probe traffic and 3) cross traffic. Consequently, packet measurements (e.g., OWD, IAT), depend on the variations of the link capacities, the rate of probe packets, the rate of cross traffic and noise (e.g., packet batching). If the rate of probe packets is lower than the available bandwidth there is no congestion and therefore the capacity has little influence on the packet measurements. One technique to remove most of the influence of the probe traffic is to use the subset of the probe train where the probe rate is constant and greater than the available bandwidth. Various embodiments of IAT fitting can be utilized to isolate the contribution of link capacities on IAT measurements.

For a link of the network path, the link available bandwidth "ABW" is related to the link capacity "C" and the rate of cross traffic on the link "SRct":

$$ABW = C - SR_{ct}$$

If the link is a hard bottleneck, the rate of probe packets cannot exceed the available bandwidth. When the network is congested, the received rate of probe packets "RRp" is equal to the available bandwidth, and directly impacted by variations in capacity. Thus:

$$RR_p = C - SR_{ct}$$

If the link is a shared queue, when the link is congested its capacity will be shared based on the ratio of input rates of the cross traffic "SRct" and probe traffic "SRp". Thus:

$$RR_p = C \cdot SR_p / (SR_{ct} + SR_p)$$

The rate of probe packets can be measured for each packet of the probe train. At the per-packet level, the rate of probe packets suffers from the same additional noise that impacts OWD, and fluctuates even when all other factors are constant. In some cases, "SRct" is constant, however in most cases it appears to be fairly random with modest variations, which is why it is often modelled as a Poisson process, this creates additional variations in the rate of probe packets.

If the rate of probe packets is measured across a section of the probe train where SRp is constant, and the link capacity does not change, RRp should be fairly consistent, the contribution of OWD noise and cross traffic should be similar to random noise with modest variation and an average close to zero. Minor variations in capacity would not be distinguishable from OWD noise and cross traffic variation. However, any major variation in capacity would result in a major variation in RRp, and could be detected by evaluating RRp trends.

In other words, a major change or a change in trend in the measure per-packet received rate "RRp" across the probe train is often due to a change in link capacity. Those changes may also be due to changes in cross traffic and spurious OWD noise, however; this has a low probability.

One challenge to estimating available bandwidth is separating effects of congestion and capacity change. Short-term changes to IAT are usually due to noise or congestion. Long-term changes to IAT are usually due to capacity change if the link is kept busy, and usually due to congestion when the link is not kept busy.

In some embodiments, the per-packet received rate is derived from the IAT of that packet, so instead of evaluating RRp trends, IAT trends can be evaluated. A change in trend in the IAT across the probe train can also be used to detect likely capacity changes. Further, utilizing IAT instead of RRp simplifies computations.

The OWD is closely related to the IAT, so in some embodiments it would be possible to evaluate the OWD trend. The relation between OWD and IAT is simple only when there is no packet losses and no packet reordering, otherwise it is more complex. Thus, working with OWD in all conditions is more complicated and working with IAT can be preferable in some embodiments.

The impact of capacity change on OWD can be indicated by changes in the rate of the OWD increase, and can be more indicative than on IAT and received rate. In the section of the probe train where SRp is constant, because IDT is constant and smaller than IAT, the OWD should increase in a relatively straight line, and deviation from this straight increase would indicate a likely change in link capacity.

Given the above, techniques and analysis that can support skipping of the less desirable packets at the beginning of the probe train can improve the overall available bandwidth estimation techniques. Thus, in various embodiments, packet skipping functionality can be utilized to exclude packets at the beginning of the probe train that are forwarded at a rate other than the long-term rate. In some embodiments, IAT fitting can be utilized to detect capacity changes. The combination of IAT fitting with packet skipping can function to mitigate capacity changes and improve the accuracy of the available bandwidth estimation.

In one embodiment, a measurement section is identified in the probe packet train. The measurement section is a contiguous part of the probe train that is away from the start, is in congestion and has stable sending rate. Many probe trains do not include a suitable part of the probe train, for example the probe trains of SLDRT and PathCos++ do not meet the requirements.

In various embodiments, the probe trains to be used include in the first one third a section where packets are sent at the maximum rate. In some embodiments, the measurement section is roughly between one-sixth and one-third of the probe train, the start and end of that section may further be adjusted based on other factors.

In some embodiments, the average per-packet IAT (aIATm) is measured. In these embodiments, aIATm is preferred rather than the receive rate or the OWD. The aIATm can be computed in many ways, for example, by taking the overall receive time of the whole measurement section divided by the number of packets.

In various embodiments, the start of the probe train before the measurement section is analyzed and the first packet that conforms the aIATm is selected. This packet is effectively earliest packet that matches the long term rate. Following that first packet that conforms to aIATm, there may be packets that do not conform to aIATm. This allows variations in the probe train due to OWD noise, packet batching and other factors, and to pick the point before which the overall IAT trend diverge significantly from the measured average.

In some embodiments, if a conforming packet is found before the measurement section, all the packets prior to that packet are skipped (eliminated) when processed by the BDA. Effectively, this constrains the BDA to pick a packet pair that is after this conforming packet. If no conforming packet is found, packet skipping can be disabled and the whole probe train can be used by the BDA. This would be the case, for example, if there is too much noise or if no congestion was created.

Verifying that a packet conforms to aIATm can be difficult because the IAT measurements can be noisy, especially if there is interrupt coalescence. There are multiple ways to verify that a packet conforms to the measured average per-packet IAT.

In some embodiments, for each packet, the expected overall IAT between the packet and the packet at the end of the measurement period if the IAT was aIATm is computed. In other words, the expected difference in receive time is determined. For packet at index ip, if the end of the measuring period is iemp, the expected overall IAT is:

$$eoIATp = aIATm*(iemp-ip)$$

Because measurements can be noisy, a range of expected IATs can be defined by adding a multiple of aIATm around the value:

$$\text{min-}eoIATp = eoIATp - 2*aIATm$$

$$\text{max-}eoIATp = eoIATp + 2*aIATm$$

The example range of plus/minus two aIATm can give good results in practice, but other ranges may work equally well.

For these packets, the actual overall IAT between that packet and the packet at the end of the measurement period can be computed by subtracting their actual received time. In some embodiments, the packet is considered conforming if its actual overall IAT falls in the range:

$$[\text{min-}eoIATp; \text{max-}eoIATp]$$

An alternate technique for verifying that packets conform to aIATm would be to perform a moving average of the IAT of adjacent packets, and find if this moving average deviates from aIATm.

The depth of the moving average (i.e. number of packets averaged) can be relevant to getting good results. In some embodiments, the group size used by packet batching mitigation is a good starting point to select the depth of the moving average. However, the depth of the moving average can be adjusted as necessary.

Figure 4:
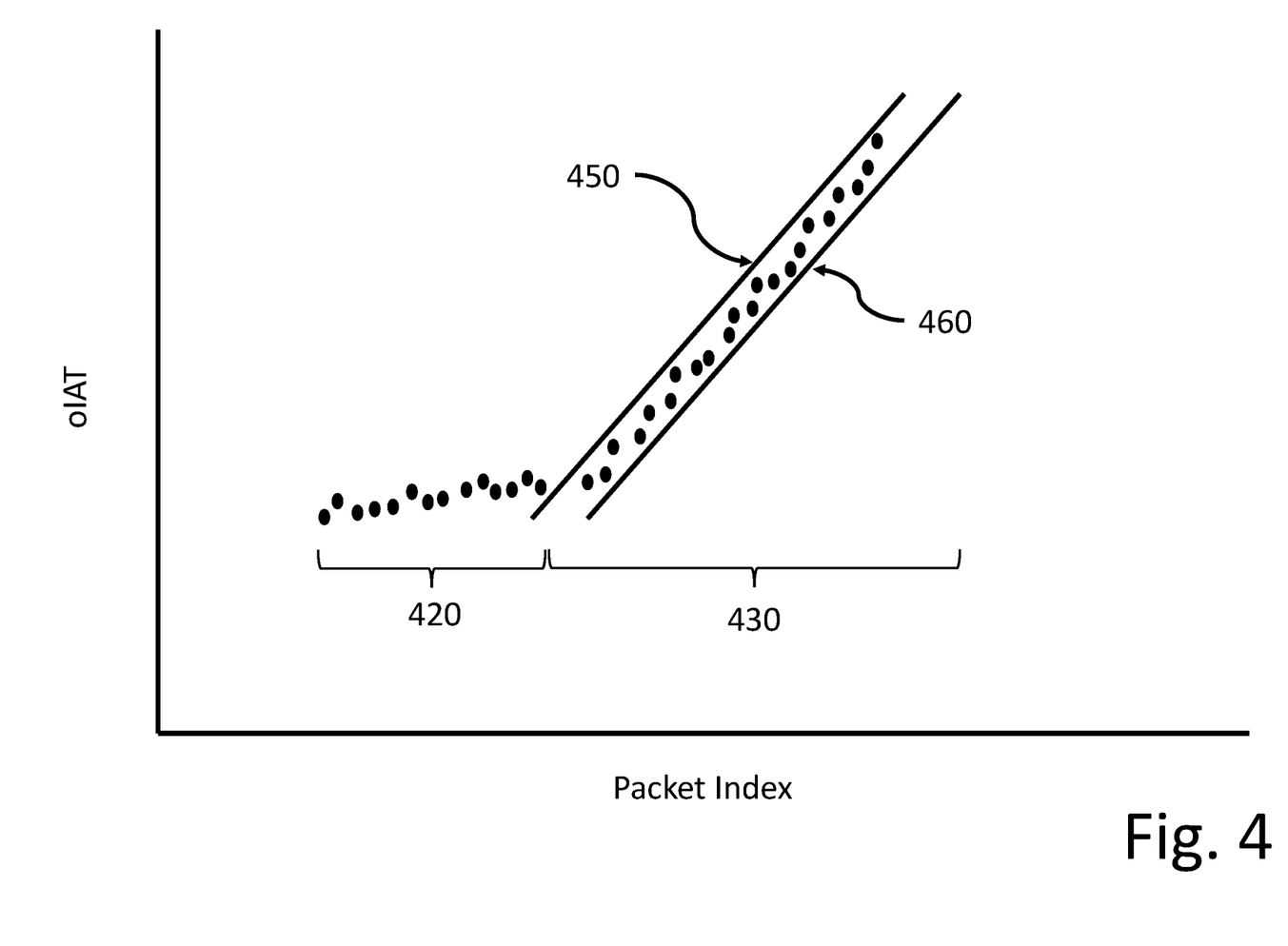
FIG. 4 is a conceptual illustration of the IAT fitting strategy as applied to a bursting condition.

FIG. 4 is a conceptual illustration of the IAT fitting strategy as applied to a bursting condition. The graph of FIG. 4 illustrates the relative values of oIAT for packets received with respect to min-eoIATp and max-eoIATp as discussed above.

In the fitting example equations discussed above, min-eoIATp and max-eoIATp can provide upper boundaries (e.g., 450) and lower boundaries (e.g., 460) between which packets eligible to be selected for the packet pair to be utilized for available bandwidth estimation can fit.

In the example of FIG. 4, group of packets 420 correspond to the bursting packets that have oIAT values that are outside of boundaries 450 and 460. In various packet skipping embodiments, packets in group 420 can be skipped for bump detection functionality. By doing this the resulting bump and packet pair selected will be more closely aligned with long-term transmission characteristics and will provide a more accurate available bandwidth estimate. This, in turn, will result in improved traffic engineering and network management.

Figure 5:
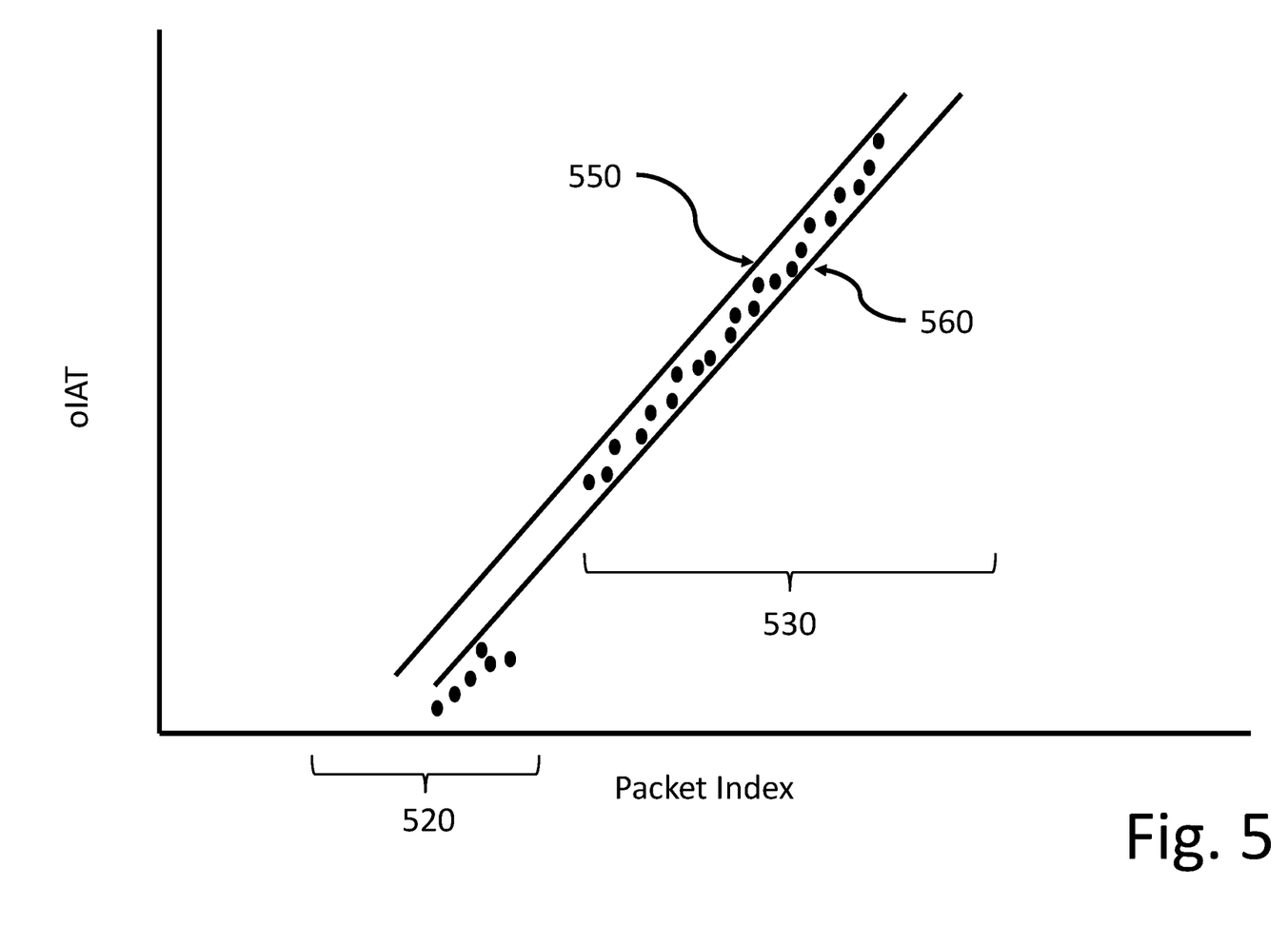
FIG. 5 is a conceptual illustration of the IAT fitting strategy as applied to a cold start condition.

FIG. 5 is a conceptual illustration of the IAT fitting strategy as applied to a cold start condition. The graph of FIG. 5 illustrates the relative values of oIAT for packets received with respect to min-eoIATp and max-eoIATp as discussed above.

In the fitting example equations discussed above, min-eoIATp and max-eoIATp can provide upper boundaries (e.g., 550) and lower boundaries (e.g., 560) between which packets eligible to be selected for the packet pair to be utilized for available bandwidth estimation can fit.

In the example of FIG. 5, group of packets 520 correspond to the cold start packets that have oIAT values that are outside of boundaries 550 and 560. In various packet skipping embodiments, packets in group 520 can be skipped for bump detection functionality. Skipping the packets in group 520 can provide the same advantages as for the bursting condition discussed above with respect to FIG. 4.

In summary, a bump detection algorithm can be used to measure congestion on a network path including, for a set of received packets, detecting a change in the capacity of the network path and selecting a packet associated with it. In some embodiments, when selecting a packet pair, all packets prior to the detected capacity change are excluded. An estimate of available bandwidth can be computed using the selected packet pair.

In some embodiments, the average per-packet Inter-Arrival Time is measured for a selected section of the received probe train to detect network capacity changes. In some embodiments, the first packet of the probe train having an average Inter-Arrival Time that conforms to a measured average Inter-Arrival Time is used to detect network capacity changes.

In some embodiments, the average Inter-Arrival Time is measured between a packet and the last packet of the selected section to verify that a packet conforms to the measured average Inter-Arrival Time. In some embodiments, the average Inter-Arrival Time is measured as a moving average of the Inter-Arrival Time to verify that a packet conforms to the measured average Inter-Arrival Time. Better available bandwidth estimates can improve the efficiency of traffic engineering for most networks, especially SD-WAN configurations.

The packet-skipping techniques described herein can improve the selection of packet pairs and lead to improved available bandwidth estimates. Packet-skipping techniques can reduce, or eliminate, the effects of network capacity fluctuations and improve available bandwidth estimates in comparison to actual long-term trends.

The improved estimated available bandwidth can be utilized, for example, to improve network traffic engineering. Network traffic engineering looks at the property of network traffic and the network elements and their connectivity to both help design the network and direct traffic onto different paths in that network. Proper traffic engineering helps to increase the network performance and lower its cost.

One of the simplest forms of network traffic engineering is to have a primary link and add a backup link to be used in case of failure of the primary link. Multi-rooted trees, such as fat trees, are topologies that offer many parallel paths, they have been extensively studied, and many approaches have been proposed to load balance packets on such topologies. The Internet is a more complex network, is split across many entities and administrative domains, and therefore traffic engineering is much more complex. On the Internet, usually each entity does fairly advanced traffic engineering within its own domain, and cross domain interactions are managed through, for example, Border Gateway Protocol (BGP) routing which allows only for fairly coarse traffic engineering.

Most techniques for traffic engineering are composed of three parts. The first part is measurement, where some attributes of the traffic and/or network are measured, which is directly improved by the techniques disclosed herein. The second part is optimization, where and optimal distribution of traffic is computed, which is improved but utilizing the improved measurements provided by the techniques disclosed herein. The third part is control, where the network is reconfigured to implement the desired distribution of traffic, which is also improved but utilizing the improved measurements provided by the techniques disclosed herein.

Traffic engineering can become particularly important in a software defined network (SDN) environment. Software Defined Networking is an approach for managing networks. SDN utilizes APIs that the datapath (packet forwarding) to be decoupled from the control plane (protocol intelligence) of network elements. In other words, a network controller, an entity outside the network element, can have fine grained control and visibility over that network element. This can be used by the network controller change the policy of network elements dynamically, or to centralize the control plane and decision making of the network.

The SDN APIs usually define both measurement and control, and this enables the network controller to measure the network and dictate a distribution of traffic. One of the limitations of SDN is that it assumes a tight coupling between the network controller and the network elements. This can work at small to medium scale, but usually does not scale to larger networks. SDN efficiency can be diminished if the network between the network controller and network elements has limited performance (low bandwidth or high latency). Moreover, the SDN approach usually does not allow the ability to cross administrative domain boundaries, because different entities can only trust controlled and limited interactions between each other.

Figure 6:
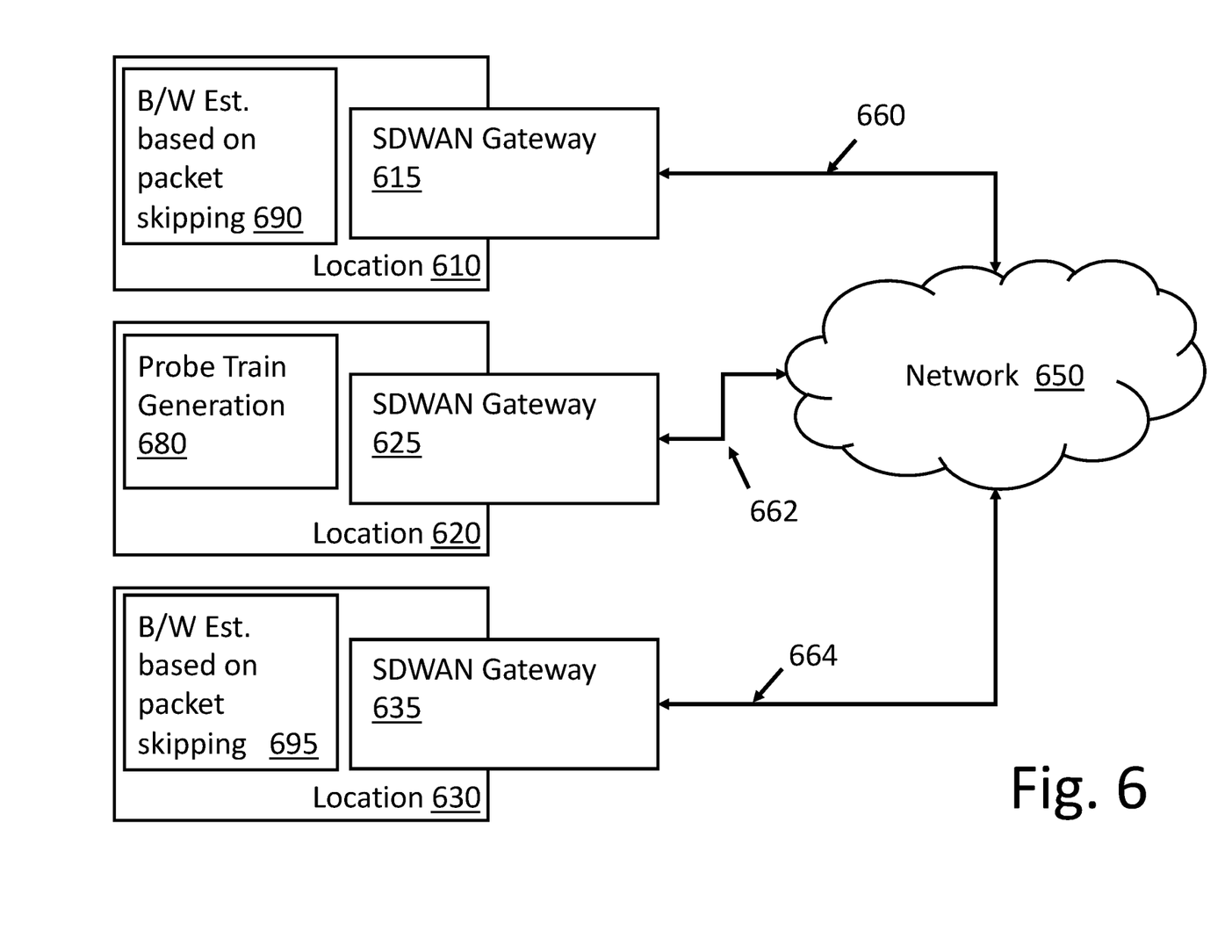
FIG. 6 is a block diagram of one embodiment of a basic SDWAN architecture.

Software Defined WAN (SDWAN) can utilize SDN principles to manage WAN connectivity. FIG. 6 is a block diagram of one embodiment of a basic SDWAN architecture. This can offer centralized visibility and control over WAN connectivity and can reduce the cost of WAN connectivity. Cost reduction can be accomplished by replacing dedicated WAN links with tunnels (e.g., 660, 662, 664). Each branch location (e.g., 610, 620, 630) can manage a consumer LAN interface (e.g., DSL, Cellular Data, cable modem) with a SDWAN gateway (e.g., 615, 625, 635) that creates one or more private tunnels (e.g., virtual private network, or VPN) to connect securely to other branches and locations over WAN links and over the Internet (e.g., 650).

While SDWAN can result in cost reductions, consumer WAN technology over the Internet may not provide the same level of availability and quality of service as dedicated WAN links. One simple SDWAN implementation is to have an SDWAN gateway (e.g., 615, 625, 635) in each physical location (e.g., 610, 620, 630) with multiple WAN links to the Internet (e.g., 650). The SDWAN gateway can implement tunnel handoff and create parallel tunnels of the internet using each WAN link and then use network traffic engineering to direct traffic to the appropriate tunnel with the goal of optimally using the available network capacity. For example, if the SDWAN gateway detects that a WAN link is down, it can direct traffic away from that WAN link to a tunnel not using that WAN link.

SDWAN gateways (e.g., 615, 625, 635) can also perform more advanced traffic engineering. For example, the gateway can monitor the performance of each tunnel (e.g., in terms of latency and/or throughput) and load balance the traffic or map each traffic type to the appropriate tunnel. One component of traffic engineering in these settings is measurement of performance for each tunnel (e.g., 660, 662, 664).

Each tunnel provides a network path across the Internet and the tunneled packets are processed by multiple network elements. The network path used by a tunnel (outside the tunnel) and the network path within the tunnel are logically different (i.e., they have different addresses), but the two network paths go through the same network elements and have almost the same performance, and their performance characteristics are strongly correlated. Thus, in various embodiments, measuring the performance of an Internet tunnel can be done by measuring the network path outside or inside the tunnel and for the discussion that follows, they can be considered the same path.

Direct measurement or SDN approach cannot be used for these network paths because network elements can belong to different administrative domains. Thus, path measurement is done via end-to-end network path estimation methods by sending probe packets from one end of the path to the other end of the path.

Thus, the improved bandwidth estimation techniques described herein can be provided to result in an improved SDWAN architecture. A probe train can be generated at a first location (e.g., 620) by the SDWAN gateway (e.g., 625) or other network component (not illustrated in FIG. 6) and can be transmitted to one or more other locations (e.g., 610, 630) and received via the corresponding SDWAN gateway (e.g., 615, 635) and bandwidth estimation (e.g., 690, 695) can be performed utilizing the packet skipping strategies described herein.

The bandwidth estimation information can be shared via network 650 and/or utilized by one or more devices at the location where the estimate was generated. The bandwidth estimation information can be used for traffic engineering and/or for other purposes.

Figure 7:
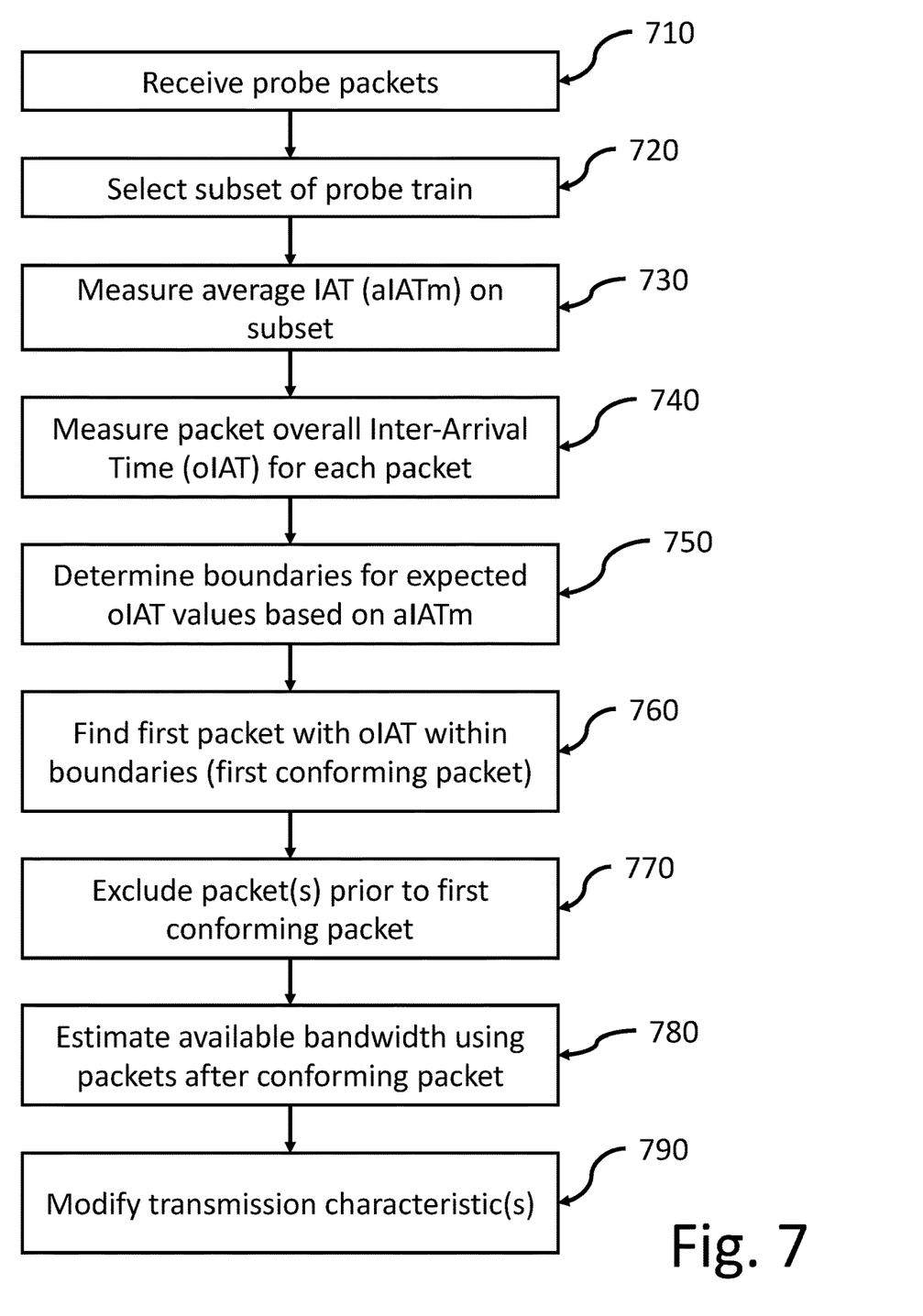
FIG. 7 is a flow diagram of one embodiment of a technique to estimate available bandwidth as described herein.

FIG. 7 is a flow diagram of one embodiment of a technique to estimate available bandwidth as described herein. The technique described with respect to FIG. 5 can utilize one or more of the techniques for estimating network congestion discussed above and can be implemented by one or more of the devices (or network components) discussed herein.

One or more probe packets are received, 710. In an SDWAN embodiment, the probe packets are received by an SDWAN gateway (or other SDWAN device) via a network interface. The probe packets can be generated by, for example, a remote device having access to the SDWAN network (e.g., another SDWAN gateway). In some embodiments, the SDWAN gateway (or other SDWAN device) has traffic engineering capability to change transmit and/or receive characteristics/settings/configurations/etc. in response to available bandwidth and/or other network measurements. The available bandwidth estimation techniques described herein can be utilized in non-SDWAN environments as well.

A subset of packets from the probe train is selected, 720. The average IAT (aITAm) is measured for the subset of packets, 730. The overall Inter-Arrival Time (oIAT) is measured for each packet, 740. Boundaries for the expected oIAT value are determined based on the aIATm, 750. The first packet with an oIAT value within the oIAT boundaries is identified, 760. This can be referred to as the first conforming packet.

Packets from the probe train prior to the first conforming packet are excluded from available bandwidth estimation, 770. Available bandwidth is estimated utilizing a packet pair selected from the reduced set of packets based on the first conforming packet, 780. One or more network transmission characteristics can be modified based on the estimated available bandwidth, 790. Various network transmission characteristics (e.g., path selection, queue depth, queue type) can be selected/modified based on the estimated available bandwidth. Alternatively, the estimated available bandwidth can be shown to a user or administrator, as part of a network management tool, as part of a web page, or in a diagnostic tool/log, for example.

Figure 8:
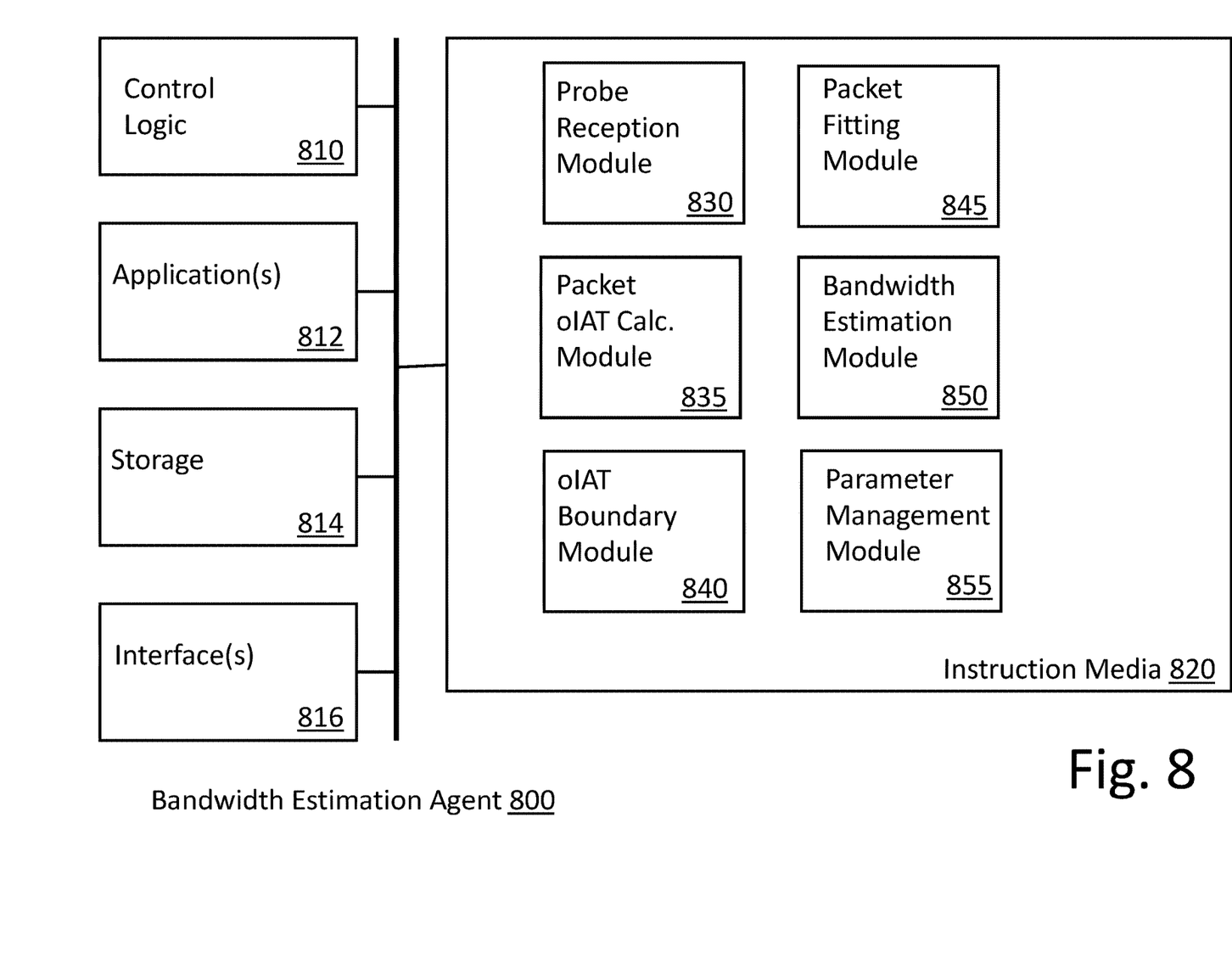
FIG. 8 is a block diagram of one embodiment of a functional agent that can estimate available bandwidth as described herein.

FIG. 8 is a block diagram of one embodiment of a functional agent that can estimate available bandwidth as described herein. In one embodiment, one or more bandwidth estimation agents may exist and/or operate within the host (e.g., SDWAN) network. The agent of FIG. 8 may provide functionality as described, for example, with respect to FIGS. 1-7. The agent of FIG. 8 may also provide additional functionality.

In one embodiment, bandwidth estimation agent 800 includes control logic 810, which implements logical functional control to direct operation of bandwidth estimation agent 800, and/or hardware associated with directing operation of bandwidth estimation agent 800. Logic may be hardware logic circuits and/or software routines. In one embodiment, bandwidth estimation agent 800 includes one or more applications 812, which represent a code sequence and/or programs that provide instructions to control logic 810.

Bandwidth estimation agent 800 includes storage 814, which represents a memory device and/or access to a memory resource for storing data and/or instructions. Storage 814 may include memory local to bandwidth estimation agent 800, as well as, or alternatively, including memory of the host system on which bandwidth estimation agent 800 resides. Bandwidth estimation agent 800 also includes one or more interfaces 816, which represent access interfaces to/from (an input/output interface) bandwidth estimation agent 800 with regard to entities (electronic or human) external to bandwidth estimation agent 800.

Bandwidth estimation agent 800 also includes instruction media 820, which represents one or more instructions storage media (e.g., internal random access memory, optical storage) for functions or modules that enable bandwidth estimation agent 800 to provide the bandwidth estimation functionality as described above. The example of FIG. 8 provides several instruction modules that may be included in instruction media 820; however, different and/or additional instruction modules may also be included.

Example instruction modules that may be involved in providing bandwidth estimation functionality described herein include, for example, probe reception module 830, packet oIAT calculation module 835, oIAT boundary determination module 840, packet fitting module 845, bandwidth estimation module 850 and/or parameter management module 855. As used herein, a module refers to routine, a subsystem, logic circuit, microcode, etc., whether implemented in hardware, software, firmware or some combination thereof.

In various embodiments, probe reception module 830 functions to receive one or more packets of a probe train. Probe reception module 830 can receive the packets through, for example, interface(s) 816. Probe reception module 830 can include one or more queues (not illustrated in FIG. 8) and/or can use memory 814. In some embodiments, probe reception module 830 can function to receive packets that are not probe packets also.

In various embodiments, packet oIAT calculation module 835 functions to determine the oIAT for one or more packets in the probe train. Packet oIAT calculation module 835 can be coupled with probe reception module 830 and/or memory 814 to process the packets.

In various embodiments, oIAT boundary module 840 functions to determine boundaries for expected oIAT values. oIAT boundary module 840 can be coupled with probe reception module 830 and/or memory 814 to process the packets. Various techniques can be used to determine oIAT boundaries.

In various embodiments, packet fitting module 845 functions to determine which packets fit within the determined boundaries based on oIAT corresponding to the packet(s). In various embodiments, bandwidth estimation module 850 functions to determine an estimated available bandwidth based, at least in part, on the bump determined based on the subset of packets from the received probe train.

In various embodiments, parameter management module 855 functions to manage one or more parameters associated with network packet communications. One or more network transmission characteristics (e.g., path selection, queue depth, queue type) can be modified based on the estimated available bandwidth.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

In the preceding description, numerous specific details are set forth. However, embodiments of the invention may be practiced without these specific details. In other instances, well-known structures and techniques have not been shown in detail in order not to obscure the understanding of this description.

What is claimed is:

1. A non-transitory computer-readable medium having stored thereon instructions that, when executed by one or more processors, are configurable to cause the one or more processors to:
   receive a train of probe packets, via a network interface, from a remote electronic device;
   measure a received time for at least a first subset of packets from the train of probe packets;
   detect a change in capacity of the network path based on the measured received time for the first subset of packets from the train of probe packets;
   exclude all packets from the train of probe packets prior to the detected change in capacity of the network path to identify a second subset of packets;
   estimate an available bandwidth based on the second subset of packets from the train of probe packets.

2. The non-transitory computer-readable medium of claim 1, wherein the available bandwidth is determined utilizing a Bump Detection Algorithm (BDA)-based technique, wherein the BDA utilizes a pair of packets from the second subset of packets.

3. The non-transitory computer-readable medium of claim 1, wherein the instructions that cause the one or more processors to exclude, with the one or more processors, all packets from the train of probe packets prior to the detected change in capacity of the network path to identify a subset of packets comprises instructions that, when executed by the one or more processors, are configurable to cause the one or more processors to:
   determine an average timing characteristic between packets of the train of probe packets; and
   identify packets having corresponding average timing characteristics within a preselected range.

4. The non-transitory computer-readable medium of claim 3, wherein the average timing characteristic comprises an average inter-arrival time (IAT).

5. The non-transitory computer-readable medium of claim 3, wherein the preselected range is based on a preselected multiple of the average IAT.

6. The non-transitory computer-readable medium of claim 3, wherein the average timing characteristics comprise moving average inter-arrival times (IATs) for the packets of the train of probe packets.

7. The non-transitory computer-readable medium of claim 1, wherein the instructions that cause the one or more processors to estimate the available bandwidth based on the second subset of packets from the train of probe packets comprises instructions that, when executed by the one or more processors are configurable to cause the one or more processors to compute an average inter-arrival time (IAT) on the second subset of packets.

8. A network node comprising:
   at least one network interface;
   a memory system;
   one or more hardware processing devices coupled with the at least one network interface and with the memory system, the one or more hardware processing devices to receive a train of probe packets, via a network interface, from a remote electronic device, to measure a received time for at least a first subset of packets from the train of probe packets, to detect a change in capacity of the network path based on the measured received time for the first subset of packets from the train of probe packets, to exclude all packets from the train of probe packets prior to the detected change in capacity of the network path to identify a second subset of packets, and to estimate an available bandwidth based on the second subset of packets from the train of probe packets.

9. The system of claim 8, wherein the available bandwidth is determined utilizing a Bump Detection Algorithm (BDA)-based technique, wherein the BDA utilizes a pair of packets from the second subset of packets.

10. The system of claim 8, wherein excluding all packets from the train of probe packets prior to the detected change in capacity of the network path to identify a subset of packets comprises:
    determining an average timing characteristic between packets of the train of probe packets; and
    identifying packets having corresponding average timing characteristics within a preselected range.

11. The system of claim 10, wherein the average timing characteristic comprises an average inter-arrival time (IAT).

12. The system of claim 10, wherein the preselected range is based on a preselected multiple of the average IAT.

13. The system of claim 8, wherein the excluded, first subset of packets from the train of probe packets comprises one or more packets from the beginning of the train of probe packets.

14. The system of claim 8, wherein the average timing characteristics comprise moving average inter-arrival times (IATs) for the packets of the train of probe packets.

15. A method comprising:
    receive a train of probe packets, via a network interface, from a remote electronic device;
    measuring, with one or more hardware processing devices, a received time for at least a first subset of packets from the train of probe packets;
    detecting, with the one or more hardware processing devices, a change in capacity of the network path based on the measured received time for the first subset of packets from the train of probe packets;
    excluding, with the one or more hardware processing devices, all packets from the train of probe packets prior to the detected change in capacity of the network path to identify a second subset of packets;
    estimating, with the one or more hardware processing devices, an available bandwidth based on the second subset of packets from the train of probe packets.

16. The method of claim 15, wherein excluding all packets from the train of probe packets prior to the detected change in capacity of the network path to identify a subset of packets comprises:
    determining an average timing characteristic between packets of the train of probe packets;
    identifying packets having corresponding average timing characteristics within a preselected range.

17. The method of claim 16, wherein the average timing characteristic comprises an average inter-arrival time (IAT).

18. The method of claim 17, wherein the preselected range is based on a preselected multiple of the average IAT.

19. The method of claim 15, wherein the excluded, first subset of packets from the train of probe packets comprises one or more packets from the beginning of the train of probe packets.

20. The method of claim 16, wherein the average timing characteristics comprise moving average inter-arrival times (IATs) for the packets of the train of probe packets.

* * * * *